United States Patent [19]

Ogino et al.

[11] Patent Number: 5,010,280
[45] Date of Patent: Apr. 23, 1991

[54] VERTICAL DEFLECTION CIRCUIT FOR CRT DISPLAY DEVICE

[75] Inventors: Masanori Ogino; Takeo Yamada; Miyuki Ikeda, all of Kanagawa, Japan

[73] Assignee: Hitachi, Ltd., Tokyo, Japan

[21] Appl. No.: 514,592

[22] Filed: Apr. 26, 1990

[30] Foreign Application Priority Data

May 29, 1989 [JP] Japan ................... 1-132604

[51] Int. Cl.$^5$ ............ H01J 29/70; H01J 29/72
[52] U.S. Cl. ........................ 315/388; 315/403; 315/389
[58] Field of Search ........... 315/403, 388, 389, 396, 315/397

[56] References Cited

U.S. PATENT DOCUMENTS 4,188,567  2/1980  Monroe .................. 315/396
4,692,670  9/1987  Imaizumi ............... 315/388
4,810,940  3/1989  Ogino et al. ........... 315/389

Primary Examiner—Theodore M. Blum
Attorney, Agent, or Firm—Antonelli, Terry, Stout & Kraus

[57] ABSTRACT

A vertical deflection circuit for a CRT display device comprises a first negative feedback circuit for detecting a vertical deflection current flowing through a vertical deflection coil feeding it back to a ramp wave generator to thereby stabilize a vertical size of the display image on the CRT screen, second negative feedback circuit connected between the deflection coil to an input of the output circuit for detecting a mean vertical deflection current which is fedback to an output circuit to thereby stabilize a vertical position of the display image on the CRT screen and a controlling circuit for controlling feedback amount of the first and second negative feedback circuits to thereby regulate a vertical size and a vertical position of the display image on the CRT screen variably.

8 Claims, 5 Drawing Sheets

VERTICAL DEFLECTION CIRCUIT FOR CRT DISPLAY DEVICE

BACKGROUND OF THE INVENTION

The present invention relates to a high stability vertical deflection circuit for a CRT display device.

In general, a conventional vertical deflection circuit is composed of a ramp wave signal generator, an amplifier having a negative feedback circuit and a deflection coil. In such vertical deflection circuit, amplitude of ramp signal generated by the ramp wave signal generator depends upon capacitance of an integrating capacitor thereof, resistance of a current limiting resistor and a source voltage, etc. When a amplitude of the ramp wave signal output of the generator varies with variation of ambient temperature, the vertical size of a display image on a display plane varies. Temperature dependency thereof is in the order of ±500 ppm/°C. Therefore, with an ambient temperature variation of, for example, 20° C. results in a variation of vertcal size of display image of about ±1%.

Such small vertical size variation of about ±1% may be negligible for an ordinary display. However, for an application in which high precision of display is required, it is necessary to restrict such variation within ±0.1%, which is difficult to realize according to the current level of the art.

Similarly, stability of vertical deviation of image is also difficult to obtain for such application.

An object of the present invention is to overcome the above mentioned difficulties.

Another object of the present invention is to provide a high stability vertical deflection circuit by which variations of vertical size and vertical position of a display image, that is, variation of deflection distortion, is minimized.

SUMMARY OF THE INVENTION

In addition to the ramp wave signal generator and the negative feedback amplifier, means for detecting amplitude of vertical deflection current, detecting/amplifying means for detecting and amplifying a mean value of vertical deflection current and negative feedback circuit for the respective means are provided according to the present invention.

An output of the means for detecting vertical deflection current and an output of the means for detecting mean value of vertical deflection current are controlled by associated feedback circuits so that variation thereof are restricted down to acceptable levels. With this control, the vertical image size which is proportional to vertical deflection current is stabilized.

The vertical image position which is proportional to the mean value of vertical deflection current is also stabilized.

DETAILED DESCRIPTION OF THE PREFERRED EMBODIMENTS

Figure 1:
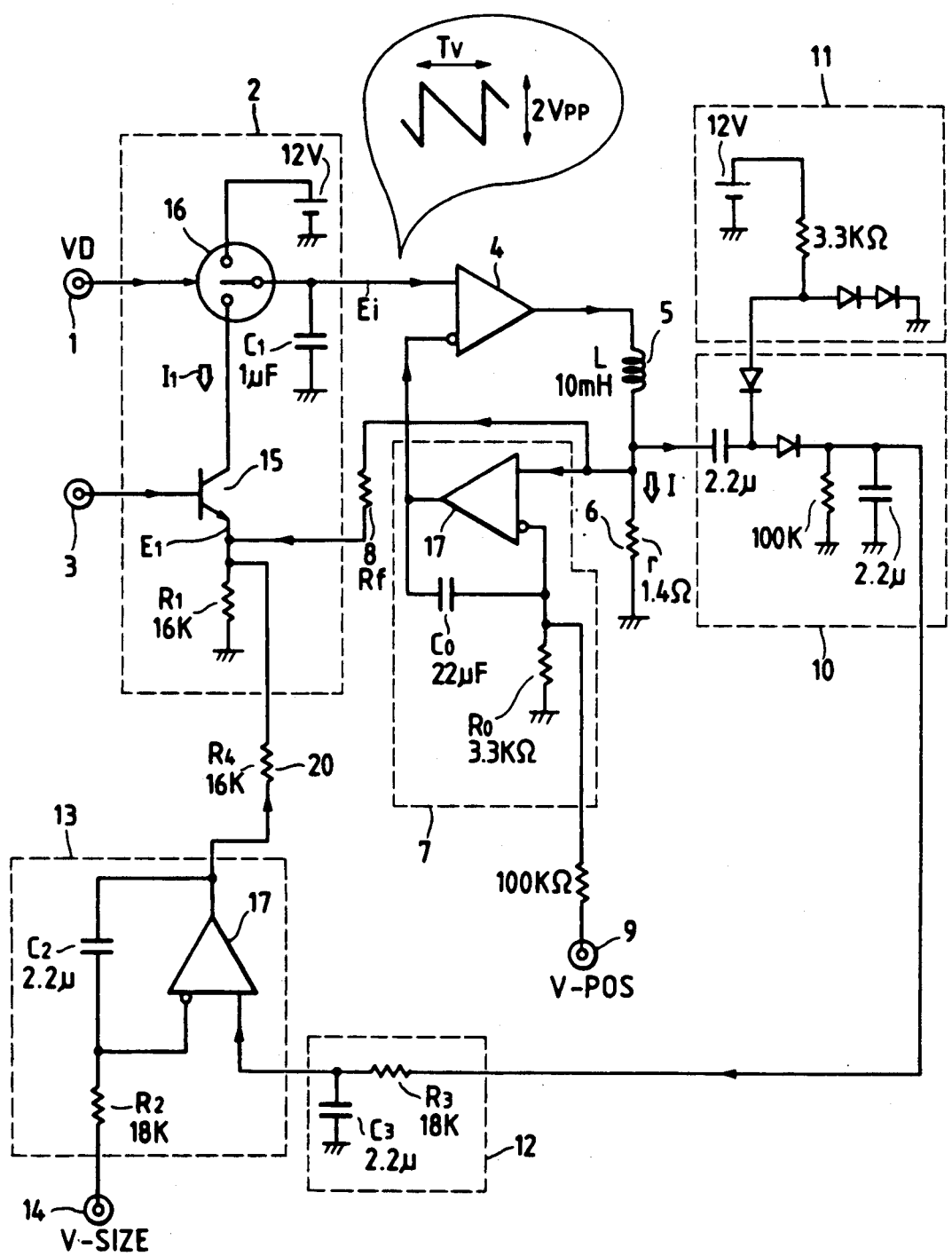
FIG. 1 is a circuit diagram of a first embodiment of the present invention.

A first embodiment of the present invention is shown in FIG. 1. In FIG. 1, a vertical deflection circuit according to the present invention includes, in addition to a conventional ramp wave signal generator 2, a vertical output amplifier 4 and a vertical deflection coil 5, a vertical deflection current detecting resistor 6, a detector/amplifier 7 for detecting and amplifying a mean value of vertical deflection current, a vertical current amplitude detecting circuit 10, a temperature compensation circuit 11, a low pass filter 12 and an amplifier 13.

The ramp wave signal generator 2 has a VD input 1 for receiving a vertical deflection synchronizing signal and a bias input 3 for receiving a d.c. bias voltage. The ramp generator 2 includes an electronic switch 16 controlled by the vertical deflection synchronizing signal at the input VD and a transistor 15 biased by the d.c. voltage supplied to a base thereof which is connected to the input terminal 3. The electronic switch 16 has a single pole, double throw configuration equivalently and a movable contact is connected to an upper stationary contact during a vertical retrace period and to a lower stationary contact during a vertical scan period. The terminal 3 is applied with a d.c. voltage of about 2.6 V to provide a d.c. voltage of about 2 Vdc at an emitter of the transister 15. Therefore, a ramp wave is obtained, in synchronism with the vertical deflection synchronizing signal at the input VD, at the output of the electronic switch 16, whose ramp is, in the shown case, $E_1/C_1 R_1 = 2V/1(uF) \cdot 16(K\Omega) = 2V/16$ ms. As a result, a ramp wave having a peak to peak amplitude of about 2 Vpp and having vertical scan period of Tv is produced at an output of the generator 2. The vertical deflection output amplifier circuit 4 which is conventional includes an output portion constituted with the so-called B class push-pull circuit and an input portion constituted with a comparator/amplifier in the form of an operational amplifier. The amplifier circuit 4 has a non-inversed input terminal connected to the output of the ramp wave signal generator 2, an inversted input terminal and an output terminal connected to the vertical deflection coil 5 connected in series with the vertical deflection current detecting resistor 6.

The mean vertical deflection current detecting amplifier 7 includes an operational amplifier 17, such as commercially available AD-504 of Analog Device Inc., having voltage gain of 100 times or more. The amplifier 17 has a non-inverted input connected to a junction between the vertical deflection coil 5 and the current detecting resistor 6, an inverted input and an output connected to the inverted input of the output amplifier circuit 4.

Transfer function Go(P) of the mean current detecting amplifier 7 can be represented by $$Go(P) = 1 + \frac{1}{\tau_o P} \quad (1)$$

where $P = j\omega$ and $\tau_o$ is a RC time constant of a feedback circuit of the operational amplifier 17 and given by $\tau_o = Co\, Ro$. In the shown example,
$= 22\ uF \times 3.3\ K\Omega \approx 70$ ms.

The equation (1) becomes infinite for P=0, i.e., d.c. component (corresponding to mean value). Practically, however, it becomes equal to voltage gain (about 100 times) of the operational amplifier 17.

An output of the mean current detecting amplifier 7 is fedback to the inverted input terminal of the vertical deflection output amplifier 4. Therefore, a vertical deflection current I flowing through the vertical deflection coil 5 can be represented by the following equation (2) on the basis of the action of the negative feedback loop constituted by the vertical deflection coil 5, the vertical deflection current detecting resistor 6 and the mean vertical deflection current detecting amplifier 7.

$$I = \frac{Ei}{rGo(P)} \quad (2)$$

where Ei is input ramp wave signal amplitude and r is resistance of the current detecting resistor 6.

Therefore, even if a mean value of the input Ei varies by, for example, about 1% of ramp wave amplitude (2 Vpp), a variation of mean value of the vertical deflection current is restricted within about 0.01% due to the fact that GO(P) is as large as about 100 times.

An average display position of an image on a CRT screen is proportional to vertical deflection current flowing through the deflection coil 6. Therefore, it is possible to restrict variation of average display position by the construction mentioned above.

Irrespective of this advantage, a certain problem may occur. That is, when time constant $\tau_o$ is about 0.3 sec or more, transient variation at an input signal switching continues about six times the time constant, i.e., about 2 sec. Therefore, time constant $\tau_o$ should be not longer than about 0.3 sec, practically.

On the other hand, where $\tau_o$ is too small, the linearity is degraded because transfer function Go(P) in the equation (2) has a frequency characteristics with respect to vertical scan frequency component. The degree of linearity degradation is given by the so-calld differentiation linearity transformation ratio Tv/$\tau_o$.

In order to compensate for this degradation of linearity, the resistor 8 having resistance Rf is connected between the emitter of the transistor 15 of the ramp wave generator 2 and the non-inverted input of the operational amplifier 17 of the mean current detecting circuit 7. Assuming that the transfer function of a feedback circuit from the non-inverted input of the operational amplifier 17 of the mean current detecting amplifier 7 through the resistor 8 to the emitter of the transistor 15 is Gf(P), $$Gf(P) = \frac{1}{C_1 R_1 P} \quad (3)$$

As is clear from a comparison between the equations (1) and (3), $$C_1 Rf = \tau_o$$

and therefore $$Rf = \frac{\tau_o}{C_1} = \frac{CoRo}{C_1} \quad (4)$$

By selecting Rf to satisfy the equation (4), the frequency dependent term $1/(\tau_o P)$ in the equation (1) appears equally at positive and negative inputs of the vertical output amplifier 4 in FIG. 1. Therefore, the degradation of linearity is substantially eliminated.

Since, however, constants of $C_1$, Co, Ro and Rf depend upon temperature, a small degradation of linearity may be left due to deviation of each constant. In order to restrict such small degradation of linearity to a negligible order (within 0.1% of display accuracy) $C_1$ and Rf should be selected to satisfy the equation (4) and $\tau_o$ should be set to a value of about 4 times the vertical scan period, i.e., 50 ms or more. Preferrably, $\tau_o$ should be about 300 ms to 50 ms.

Now, a vertical image size stabilizing portion will be described. In FIG. 1, the vertical size stabilizing portion comprises a loop including a vertical deflection current detecting circuit 10 composed of a pair of silicon diodes, a capacitor and a resistor for detecting an input peak to peak voltage of 2 Vpp to produce a d.c. voltage 2 Vdc, a temperature compensation circuit 11 for compensating for the temperature dependency of the detecting diodes, a low pass filter 12 composed of a capacitor $C_3$ and a resistor $R_3$, an amplifier 13 composed of an operational amplifier 17, a capacitor $C_2$ and a resistor $R_2$ connected in series with the capacitor $C_2$ and a resistor 20.

In operation, when the vertical deflection current becomes too large, an output d.c. voltage of the vertical current detecting circuit 10 increases and, thus, outputs of the low pass filter 12 and the amplifier 13 also increase. Therefore, a current $I_1$ flowing through the resistor 20 and the ramp wave generator 2 decreases. As a result, amplitude of ramp wave output thereof becomes smaller, so that excessive amplitude of vertical deflection current is restricted.

The cut-off frequency of the vertical size stability control loop should be made about 1 Hz or more in order to quickly terminate the transient response at signal switching. On the other hand, in order to prevent the degradation of linearity, the frequency should be 10 Hz or lower. With values of the respective components shown in FIG. 1, cut-off frequency of the size stability control loop is about 4 Hz.

The loop gain $G_l(P)$ of this control loop is given by $$G_l(P) = \frac{1}{1 + C_3 R_3 P} \times \left(1 + \frac{1}{C_2 R_2 P}\right) \frac{Tv}{R_4 C_1} \quad (5)$$

where Tv is vertical scan period.

Therefore, when $C_3 R_3 = C_2 R_2 = \tau_2$, $$G_l(P) = \left(\frac{1}{\tau_2 P}\right) \times \left(\frac{Tv}{C_1 R_4}\right) \quad (6)$$

Since the cut-off frequency is obtained under a condition of $|G_l(j\omega)| = 1$, an actual circuit design can be made by using this condition in the equation (6).

The accuracy of vertical deflection current stabilization in the construction shown in FIG. 1 is substantially determined by stability of the current detecting resistor 6. Therefore, when a resistor having variation of temperature dependency of ±50 ppm/°C. is used as the resistor 6, stability within ±0.1% for temperature variation of 20° C. is realized.

Vertical position and size of display image can be arbitrarily set by changing d.c. voltage to be applied to a vertical position (V-POS) terminal 9 and a vertical size (V-SIZE) terminal 14 in FIG. 1. Therefore, it becomes adaptable to various signals source formats (for example, vertical scan frequency of 40 Hz to 120 Hz).

In the embodiment shown in FIG. 1, a fixed d.c. voltage of about 2.6 Vdc is applied to the terminal 3. In order to apply this invention to a multi-scan type display device, a voltage Ef proportional to vertical scan frequency can be applied to this terminal 3. The voltage Ef is obtained by counter-detecting the input VD (1 in FIG. 1) by a mono stable multivibrator and a low pass filter.

Figure 2:
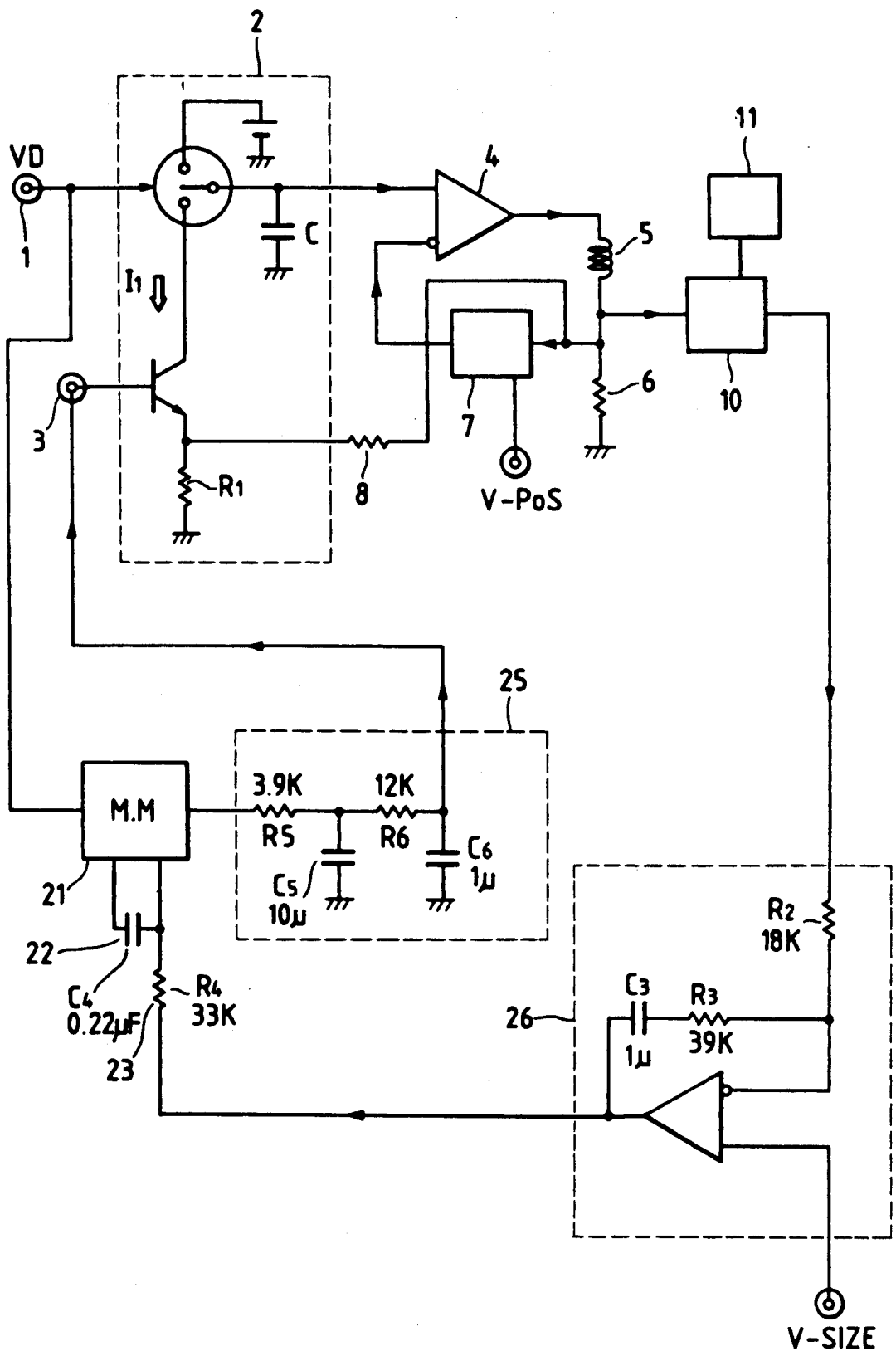
FIG. 2 is a circuit diagram of a second embodiment of the present invention.

It is possible to utilize such mono stable multivibrator in a portion of the vertical size control loop. FIG. 2 shows an example of such case as a second embodiment. In FIG. 2, operatuon of components depicted by same reference numerals as those in FIG. 1 are the same and, therefore, details thereof are omitted.

A mono stable multivibrator 21 may comprise a commercially available, general type TTL. A capacitor 22 and a resistor 23 are used to determine an output pulse width of the mono stable multivibrator 21 and a time constant of this RC circuit is set as smaller then the minimum vertical scan period of a signal source. A low pass filter 254 composed of resistors $R_5$ and $R_6$ and capacitors $C_5$ and $C_6$ produces at its output a d.c. voltage proportional to vertical scan frequency. A reference numeral 26 depicts an amplifier corresponding to the block 13 in FIG. 1.

When vertical deflection current becomes excessive, the output of the amplitude detecting circuit 10 increases and thus the output of the amplifier 26 decreases.

Thus, the output pulse width of the mono stable multivibrator 21 decreases and the output of the low pass filter 25 decreases. Thus, the current $I_1$ flowing through the ramp wave generator 2 decreases, resulting in a reduced ramp wave amplitude from the generator 2. Therefore, the excessive increase of vertical deflection current is restricted.

Loop gain of the size stabilizing control loop including the amplifier 26, the mono stable multivibrator 21 and the low pss filter 25 can be represented by $$G_(P) \frac{R_3 \left(1 + \frac{1}{\tau_3 P}\right)}{R_2} \times \frac{\tau_4}{T_v} \times \frac{\frac{T_v}{C_1 R_1}}{(1 + \tau_5 P)(1 + \tau_5 P)} \quad (7)$$

where
$\tau_3 = C_3 R_3$
$\tau_4 = C_4 R_4$
$\tau_5 = C_5 R_5$
$\tau_6 = C_6 R_6$ Therefore, when circuit constants of the constituent elements of the loop are selected such that $\tau_3 = \tau_5$, $$G_(P) = \frac{R_3}{R_2} \cdot \frac{\tau_4}{C_1 R_1} \cdot \frac{1}{\tau_3 P(1 + \tau_5 P)} \quad (8)$$

In the shown case, $$G_(P) = \frac{1}{40 \text{ms} P(1 + 12 \text{ms} P)} \quad (9)$$

Therefore, the cut-off frequency is about 4 Hz. As is clear from a conmparison between the equation (6) corresponding to FIG. 1 and the equation (8) corresponding to FIG. 2, the loop gain of the case shown in FIG. 2 has no dependency on Tv, which is a merit over the construction shown in FIG. 1 in which loop gain varies proportionally to vertical scan period Tv.

Therefore, the second embodiment can be applied to a signal source having a wider vertical scan frequency range (40 Hz to 120 Hz).

A common characteristics of the first embodiment and the second embodiment is that the display image position and display image size can be arbitrarily controlled by changing d.c. voltages applied externally to the V-POS terminal and the V-SIZE terminal, respectively. Therefore, each of these embodiments can be used in a multi scan type display device capable of responding to various signal sources.

Figure 3:
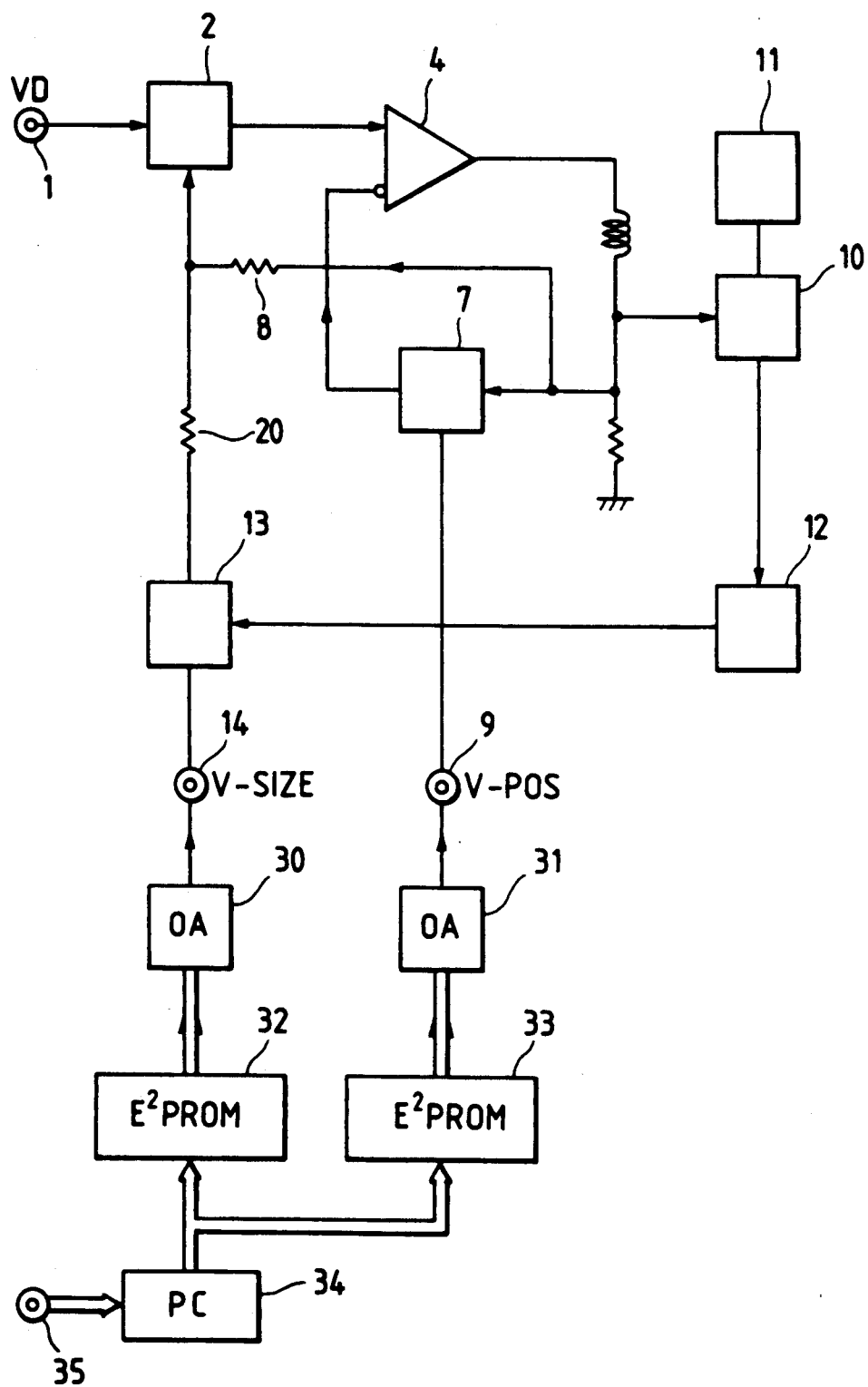
FIG. 3 is a block diagram showing an application of the present invention to a multi-screen display device.

FIG. 3 shows an embodiment suitable to use in a multi scan type projecting display device.

In FIG. 3, reference numerals 1 to 14 depict components in FIG. 1 depicted by same reference numerals, respectively. The embodiment shown in FIG. 3 includes D/A converters 30 and 31 for applying d.c. voltages to the V-SIZE and V-POS terminals 14 and 9, respectively, electrically erasable programmable read only memory (EEPROM) 32 and 33, a controller 34 and a format control terminal 35. Upon an input signal from the input format control terminal 35, the controller 34 selects addresses of the EEPROM's 32 and 34 to supply digital data therein to the D/A converters 30 and 31. Resultant analog d.c. voltages from the D/A converters 30 and 31 are supplied to the terminals 14 and 9 to control size and position of a display image.

Figure 4:
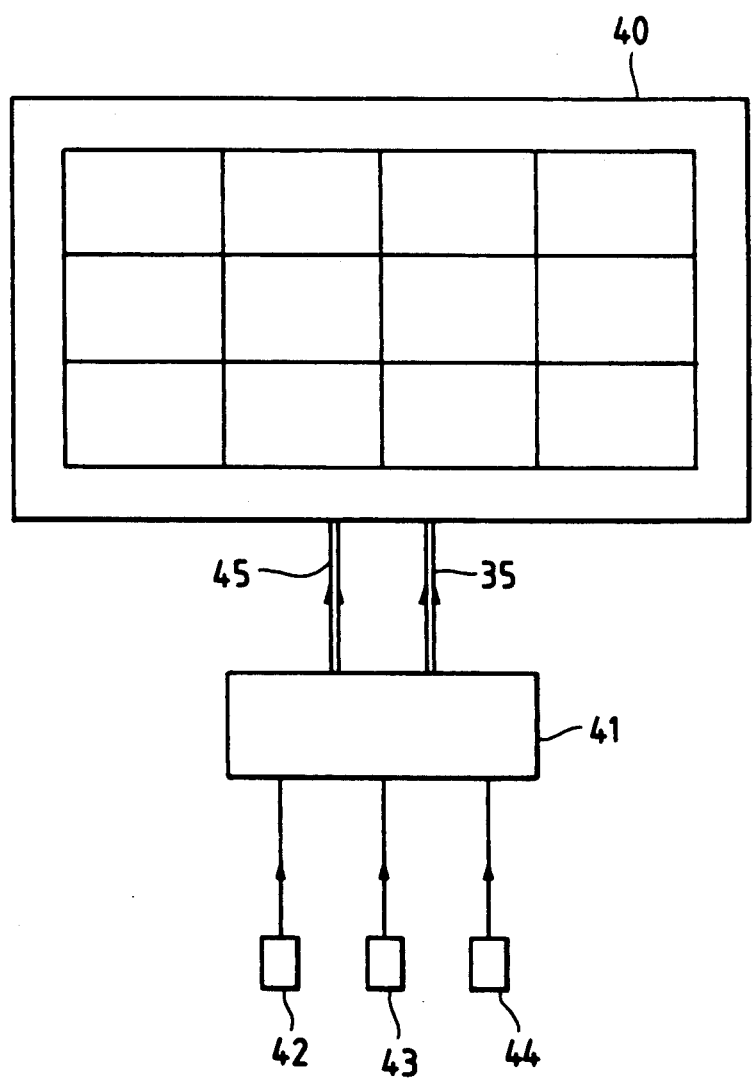
FIG. 4 is a schematic illustration showing a concept of the multi-screen display system.

FIG. 4 shows a multi screen type projecting display system. In FIG. 4, the multi screen display 40 is constituted with $3 \times 4 = 12$ projecting display units. The system further includes a signal distribution processor 41 which may be conventional and signal sources 42, 43 and 44 of various formats. When any of the signal sources 42, 43 and 44 is selected, a signal from the selected source is divided into 12 screen segments which are sent to the system as image signal 45, respectively. According to the selected signal source, image size and image position required for the respective display units are determined. Such information is set to the system as the format control signal 35.

Since the components 35, 40, 41, 42, 43, 44 and 45 can be arbitrarily constructed by those skilled in the art according to the known digital technique, details thereof are omitted.

Figure 5:
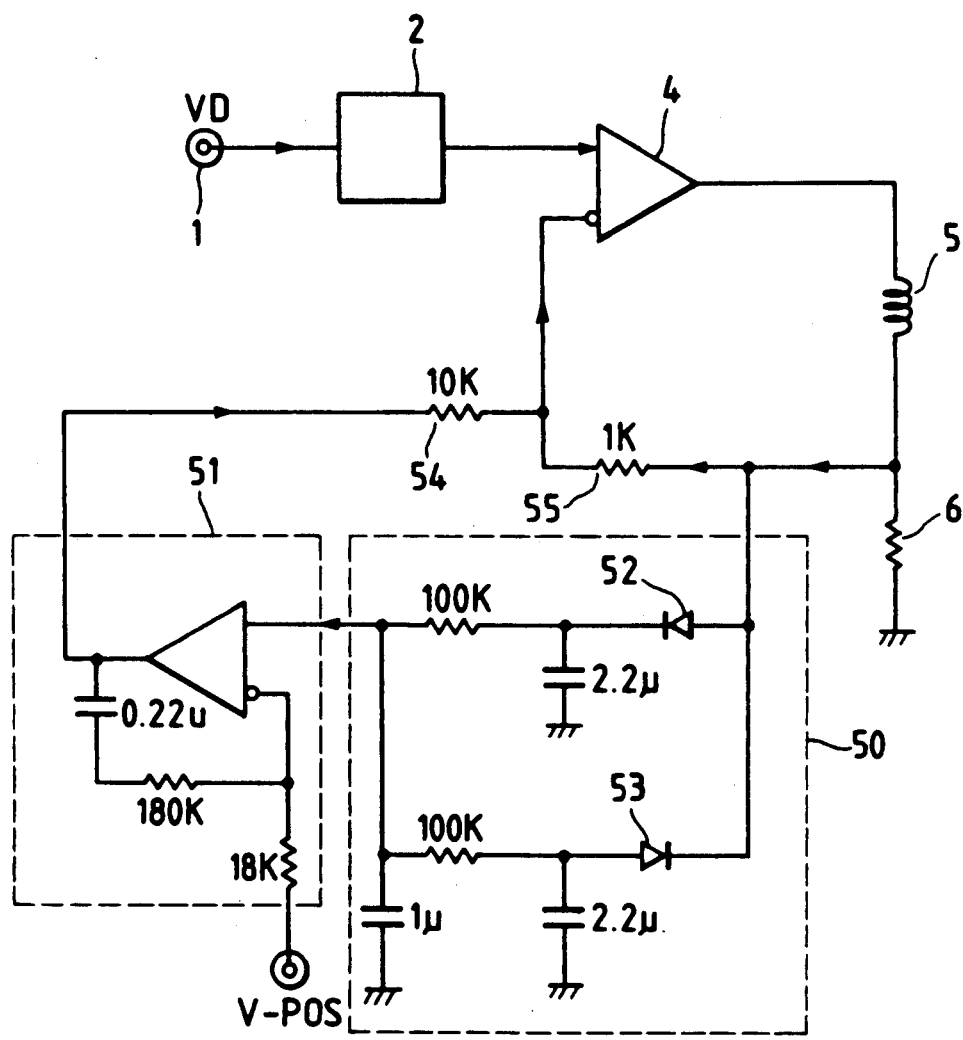
FIG. 5 shows a modification of a main portion of the first embodiment shown in FIG. 1.

FIG. 5 shows a modification of the mean vertical deflection current detecting/amplifying means. In FIG. 5, components depicted by reference numerals 1, 2 and 4 to 6 are the same as those in FIG. 1.

In FIG. 5, blocks 50 and 51 constitute the mean vertical deflection current detecting/amplifying means. The block 50 is a detector portion and includes a positive peak value detecting diode 52 and a negative peak value detecting diode 53. Therefore, a mean value of the positive and negative peak values is obtained at an output of the block 50. The mean value is amplified by the block 51 which is an amplifying portion, mixed with the deflection current by resistors 54 and 55 and fedback to an inverted input terminal of the vertical output circuit 4. This construction serves, as the whole, to provide a negative feedback to restrict a variation of the means value of vertical deflection current. In this modification, an additional advantage is obtained, that, due to the positive and negative peak value detection, degradation of linearity is minimized. Other chracteristics of this modification are the same as those of the embodiment shown in FIG. 1.

According to the present invention, it is possible to precisely stabilize vertical size and vertical position of a display image on a CRT display device. Further, it is possible to obtain a vertical deflection circuit capable of automatically following any of various signal sources having different vertical scan frequencies. In addition, the vertical size and position of a display image can be arbitrarily controlled by changing respective d.c. voltages applied externally.

What is claimed is:

1. A vertical deflection circuit for a CRT display device, including a ramp wave signal generator having a vertical synchronizing signal input and a biasing terminal and an output circuit including an operational amplifier having an inverted input and a non-inverted input connected to an output of said ramp wave signal generator, said output circuit responsive to a ramp wave signal at an output of said ramp wave signal generator to drive a vertical deflection coil, said vertical deflection circuit comprising: first feedback means including amplitude detector means for detecting vertical deflection current amplitude and for feeding said vertical deflection current amplitude back to said ramp wave signal generator to thereby stabilize vertical size of a display image on a screen of said CRT device; second negative feedback means connected between said deflection coil and said inverted input of said output circuit for detecting a mean vertical deflection current and for feeding a detected mean vertical deflection current back to said output circuit to thereby stabilize a vertical position of said display image on said CRT screen and means for controlling amounts of feedback of said first feedback means and said second negative feedback means to thereby regulate vertical size and vertical position of said display image on said CRT screen variably.

2. The vertical deflection circuit claimed in claim 1, wherein said second negative feedback circuit means comprises an operational amplifier circuit having voltage gain of not less than 100, said operational amplifier circuit having an inverted input, a non-inverted input connected to said vertical defection coil and an output connected to said inverted input of said output circuit, said operational amplifier circuit having a negative feedback circuit between said inverted input and said output thereof for restricting a variation of means vertical deflection current to thereby restrict a variation of mean position of an image display on the CRT screen.

3. The vertical deflection circuit claimed in claim 2, further comprising resistor means connected between said non-inverted input of said operational amplifier of said second negative feedback circuit means and said ramp wave signal generator for compensating for degradation of linearity of said second negative feedback circuit means.

4. The vertical deflection circuit according to claims 1 or 2, wherein said first circuit feedback circuit means includes a temperature compensation circuit for compensating temperature dependency of said amplitude detecting means thereof.

5. The vertical deflection circuit claimed in claim 1, wherein said first feedback means includes an amplitude detecting means connected to said resistor for detecting amplitude of vertical deflection current flowing therethrough, an operational amplifier having an negative feedback circuit, said operational amplifier being adapted to amplify the vertical deflection current, and a voltage generating means for generating a voltage having an amplitude proportional to a vertical deflection frequency at said output of said ramp wave signal generator, said voltage generating means having an input connected to an output of said operational amplifier, another input connected to said vertical synchronizing signal input of said ramp wave signal generator and an output connected to said biasing input terminal of said ramp wave signal generator.

6. The vertical deflection circuit claimed in claim 1, wherein said second negative feedback circuit means includes a means vertical deflection current detector, an operational amplifier having a negative feedback circuit for amplifying a detected mean current and means for mixing an output of said operational amplifier and an input of said mean vertical deflection current for feedback to said inverted input of said output circuit.

7. The vertical deflection circuit as claimed in any one of claims 1-3 or 5-7, wherein said means for controlling amounts of feedback of said first feedback means and said second negative feedback means comprises a process control means having a format control terminal, a pair of electrically erasable PROM's having inputs connected to said process control means and a pair of digital/analog converters having inputs connected to outputs of said PROM's, said digital/analog converters being connected to said first feedback means and said second negative feedback means to control feedback amounts thereof to thereby regulate vertical position and vertical size of the display image.

8. The vertical deflection circuit claimed in claim 4, wherein said means for controlling amounts of feedback of said first feedback means and said second negative feedback means comprises a process control means having a format control terminal, a pair of electrically erasable PROM's having inputs connected to said process control means and a pair of digital/analog converters having inputs connected to outputs of said PROM's, said digital/analog converters being connected to said first feedback means and said second negative feedback means to control feedback amounts thereof to thereby regulate vertical position and vertical size of the display image.

* * * * *